Figure 1:
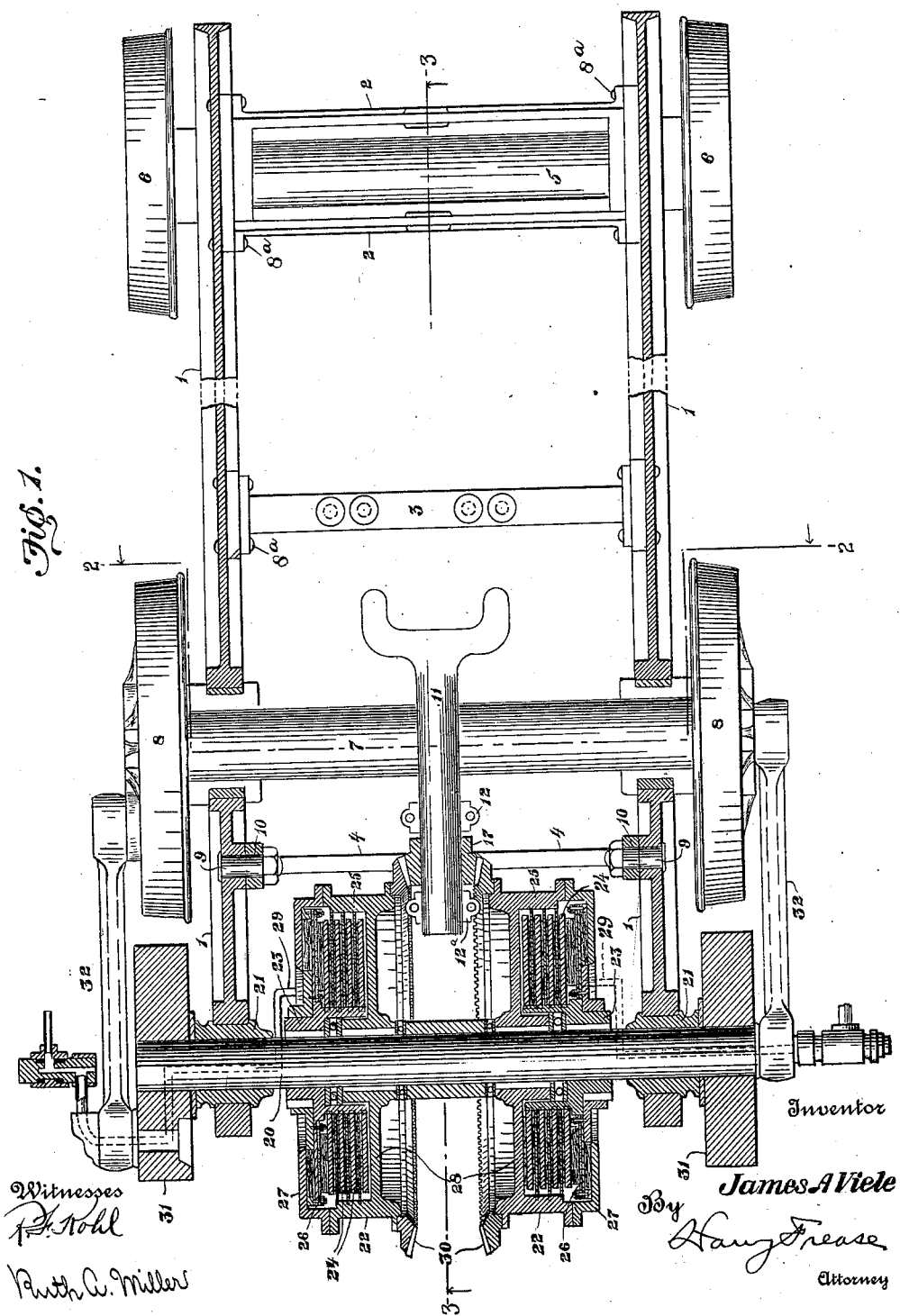

J. A. VIELE.
REVERSING TRANSMISSION GEARING.
APPLICATION FILED OCT. 6, 1911.

1,046,512.

Patented Dec. 10, 1912.
2 SHEETS—SHEET 1.

Witnesses
F. Kohl
Ruth A. Miller

Inventor
James A Viele
By Harry Frease
Attorney

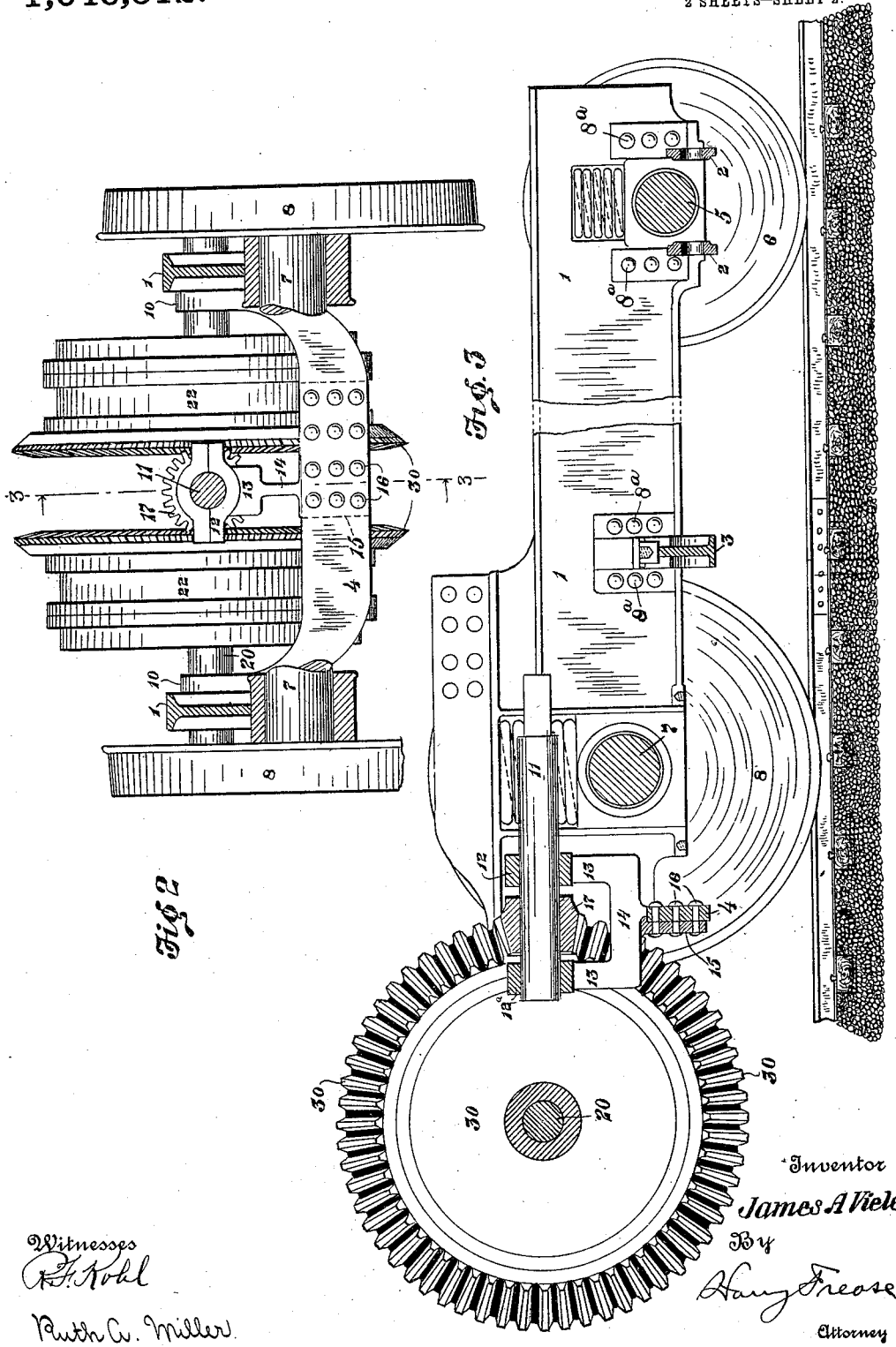

UNITED STATES PATENT OFFICE.

JAMES A. VIELE, OF WARREN, PENNSYLVANIA.

REVERSING TRANSMISSION-GEARING.

1,046,512. Specification of Letters Patent. Patented Dec. 10, 1912.

Application filed October 6, 1911. Serial No. 653,135.

*To all whom it may concern:*

Be it known that I, JAMES A. VIELE, a citizen of the United States, residing at Warren, in the county of Warren and State of Pennsylvania, have invented certain new and useful Improvements in Reversing Transmission-Gearing, of which the following is a specification.

The invention relates to the transmission gearing of a motor car, wherein the power is produced by an internal combustion engine or other form of motor, and is transmitted by the gearing to the driving wheels of the vehicle; and the object of the improvement is to provide a gearing of this character for use in heavy cars built for use on railroads wherein the ponderous weight of the car, the rigidity of the track and roadbed, and the loads, shocks and vibrations imposed upon the gearing, subject the same to unusual strains both in kind and degree.

The invention furthermore pertains to the adaptation of pneumatic friction clutches in gearings of this character whereby the work of starting, propelling and reversing the car can be taken up, and the speed thereof varied, in a gradual manner without unduly shocking or straining the gearing or jolting the car; and the improvement also pertains to certain features of construction whereby the bearing for the driving shaft may slightly oscillate to accommodate the twisting strains to which the truck frame may be subjected.

The general objects of the invention, thus set forth in general terms, are attained by the mechanism, construction and arrangement illustrated in the accompanying drawings, forming part hereof, in which—

Figure 1 is a plan view, partly in section, of a motor truck frame showing the improved form of gearing; Fig. 2, an upright longitudinal section of same on line 2—2, Fig. 1; and Fig. 3, an upright transverse section of same on line 3—3, Figs. 1 and 2.

Similar numerals refer to similar parts throughout the drawings.

The frame of the motor truck is composed of the side girders 1 and the connecting cross girders 2, 2, 3 and 4: the cross girders 2, 2, being the forward girders, are located one on each side of the axle 5 of the pivot wheels 6; the cross girder 3, being the main cross girder, is located just forward of the axle 7 of the drive wheels 8; and the cross girder 4, being the swinging bearing girder, is located just in rear of the drive wheel axle. The ends of the forward and main cross-girders are rigidly secured to the side girders by suitable bolts or rivets $8^a$ as shown, and the ends of the oscillating cross-girder are secured to the side girder by the transverse pivot bolts 9.

The swinging cross girder 4 is formed with its ends curved upward in the form of a U, and the ends are provided with eyes 10 which are swung upon the transverse pivot bolts 9 secured to the side girders, so that the yoke of the U-shaped girder hangs downward and may oscillate forward and rearward upon the transverse pivots 9. The longitudinal main-shaft extension 11 of the motor (not shown) constitutes the driving shaft of the gearing, and is journaled in the bearings 12 and $12^a$, which are formed or secured on the upper ends of the arms 13 of the Y-shaped bracket 14, the stem 15 of which is rigidly secured to the depending yoke of the swinging girder, by means of suitable bolts or rivets 16, so that these bearings are adapted to oscillate forward and rearward with the girder to compensate for slight longitudinal movement or inclination of either the shaft or the side girders with reference to each other, but at the same time holding the shaft substantially rigid against a lateral displacement. The bevel pinion 17 is secured to the driving shaft 11, preferably between the bearings 12 and $12^a$, so as to sustain the strains on this pinion by both bearings.

The transverse countershaft 20 is located adjacent to the free end of the driving shaft and in the same horizontal plane therewith, and is journaled in suitable bearings 21 carried by the side girders 1 of the truck frame. Two multiple-disk clutches 22 are mounted on the countershaft, one on each side of the line of the driving shaft 11. Each clutch is composed of a driving member 23 keyed to the countershaft and having a series of driving disk rings 24 feathered by their inner edges thereon, and a driven member 25 journaled on the countershaft and shaped as a cylindric case and having a series of intervening driven disk rings feathered thereon by their peripheral edges, there being an inflatable diaphragm 26 feathered on the driving member between one head 27 of the driven member and the adjacent driving disk ring, whereby all the disk rings may be clamped together and against the other head 28 of the driven member, as by compressed air supplied through the tubular duct 29 and controlled by a valve, not shown; which particular form of multiple disk clutch is not claimed herein but is more fully set forth and claimed in a separate application filed October 6, 1911, Serial No. 653,136 which is referred to for a particular description of its details.

On the cylindric case 25 of each driven clutch member is formed or secured a bevel gear wheel 30, which gear wheels mesh with the bevel pinion 17 on opposite sides of the driving shaft; so that the gear wheels will be rotated in opposite directions by the rotation of the pinion. By this construction and arrangement, it is evident that, when the driving shaft is rotated, and the clutch disks are not clamped together, the driven members of both clutches will be rotated freely on the countershaft in reverse directions, but that, when the disk rings of one of the clutches are clamped together, as by compressed air introduced through the corresponding supply duct 29, this clutch will rotate the countershaft in one direction, and that a similar clamping of the disk rings of the other clutch will rotate the countershaft in the opposite direction; which rotation one way or the other is communicated to the drive wheels of the car trucks by means of the crank-disks 31 which are formed or secured on the ends of the countershaft, and the connecting rods 32 extending between these crank-disks and the drive wheels; all of which can be done without either stopping or reversing the engine or motor, and renders this form of transmission gearing specially desirable in cars used for switching purposes, wherein high speed is not necessary but a quick reversing action is desirable without stopping or reversing the engine.

I claim:

1. A reversing transmission gearing for a motor car including a transverse axle with drive wheels thereon, a longitudinal driving shaft above the axle with a bevel pinion thereon, a transverse countershaft adjacent to the end of the driving shaft with crank disks thereon, connecting bars between the crank disks and the drive wheels, and two friction clutches on the countershaft having bevel gear wheels thereon in mesh with the pinion on opposite sides of the driving shaft, with pneumatic means for clamping the clutches, one at a time, to the countershaft.

2. In a motor car truck, side girders, a U-shaped cross girder having its upturned ends transversely pivoted to the side girders, a Y-shaped bracket secured by its stem to the yoke of the cross girder and having bearings on its arms, and a longitudinal shaft journaled in the bearings.

3. In a motor car truck, side girders, a U-shaped cross girder having its upturned ends transversely pivoted to the side girders, a bearing mounted on the yoke of the cross girder, and a longitudinal shaft journaled in the bearing.

4. In a motor car truck, side girders, an oscillating cross girder swung on the side girders, a bearing mounted on the cross girder, and a longitudinal shaft journaled in the bearing.

JAMES A. VIELE.

Witnesses:
 FRANK M. KNAPP,
 RALPH N. BROWN.

Copies of this patent may be obtained for five cents each, by addressing the "Commissioner of Patents, Washington, D. C."